United States Patent [19]
Stoffels

[11] 4,216,686
[45] Aug. 12, 1980

[54] ROTARY CUTTING MECHANISM

[75] Inventor: Carl A. Stoffels, Flemington, N.J.

[73] Assignee: Judelshon Industries, Inc., Jersey City, N.J.

[21] Appl. No.: 937,812

[22] Filed: Aug. 29, 1978

[51] Int. Cl.[3] .......................... B23B 5/14; B23B 25/02

[52] U.S. Cl. .......................................... 82/53; 82/86; 82/92; 82/98

[58] Field of Search .................... 82/46, 47, 53, 86, 92, 82/98, 83; 83/425.3, 425.2, 437, 429, 923

[56] References Cited

U.S. PATENT DOCUMENTS

| | | | |
|---|---|---|---|
| 871,828 | 11/1907 | Sexton . | |
| 1,098,167 | 5/1914 | Potter . | |
| 1,123,532 | 1/1915 | Heynau . | |
| 1,242,448 | 10/1917 | Judelshon . | |
| 1,372,127 | 3/1921 | Faunce . | |
| 1,741,711 | 12/1929 | Pearson . | |
| 1,835,398 | 12/1931 | Huston | 82/92 |
| 1,953,205 | 4/1934 | White et al. | |
| 2,015,877 | 10/1935 | Thompson . | |
| 2,457,310 | 12/1948 | Judelshon . | |
| 3,148,570 | 9/1964 | Bogert | 82/53 |
| 3,350,967 | 11/1967 | Gerstein | 82/46 |
| 3,752,024 | 8/1973 | Judelshon . | |

*Primary Examiner*—Leonidas Vlachos
*Attorney, Agent, or Firm*—Amster, Rothstein & Engelberg

[57] ABSTRACT

A rotary cutting mechanism for transversely slicing an elongated rotatably driven roll of material such as plastic film into a number of narrower rolls includes a pair of spaced-apart knife cutting blades mounted for free rotation about an axis parallel to the longitudinal axis of the roll. A rotary saw blade is mounted intermediate and in axial alignment with the cutting blades, and is independently driven to remove material between the cutting blade edges as the blades are moved together to slice the roll. The finished narrower cut rolls therefore exhibit smoothly finished side edges and are readily separable from each other, there being no frictional heat developed by the cutting blade edges which are free to turn with the material on the roll as they slice through it.

12 Claims, 6 Drawing Figures

ROTARY CUTTING MECHANISM

DESCRIPTION OF THE INVENTION

The present invention relates generally to cutting mechanisms, and more particularly to cutting mechanisms for slicing relatively dense rolls of film material such as polyethylene or other like plastic material into narrower finished rolls.

In U.S. Pat. No. 2,457,310 issued Dec. 28, 1948, the contents of said patent being incorporated by reference herein, there is shown a cutting machine which enables automatic or manual cutting of an elongated roll of film material into a number of finished rolled strips of prescribed width. The machine includes a frame upon which is supported a stationary shaft which receives the roll of material as wound on a core, the roll usually being enclosed within a paper wrap. The roll is rotated about the longitudinal axis of the shaft by means of a chuck which clamps one end of the roll and is driven by an appropriate variable speed drive mechanism. A rotary knife blade is mounted on a rotatable shaft which is movable toward and away from the shaft supporting the roll of material. The blade shaft, in turn, is mounted on a movable carriage which has an indexing mechanism relative to the frame of the machine. The carriage may then be moved stepwise into successive indexed positions along the length of the machine toward the chucked end of the roll of material. After each stepwise advance of the carriage, the blade shaft is actuated, either automatically or manually, to move the knife blade inwardly toward the roll supporting shaft so that the blade cuts the material in a plane substantially perpendicular to the longitudinal shaft axis, and shears the material transversely through the roll and its core, thereby severing it into tape or ribbon rolls of the desired widths.

As such rotary knife cutting machines are often employed for cutting relatively dense rolls of material, such as tightly rolled thin polyethylene film and the like, it will be appreciated that problems can arise in the event a knife blade having a single cutting edge is used for the cutting operation. For example, because of an undesirable amount of heat normally developed by friction when cutting plastic material with a blade at relatively high speed, it is not uncommon for the material to fuse itself back together along the edges which face each other after the material is cut and the knife blade is removed. In order to avoid this fusing problem, and to obtain a smooth, clean cut appearance on the sides of the finished cut rolls, a two-stage operation employing a saw blade, and a double-edged trimming knife blade was developed such as disclosed in U.S. Pat. No. 3,752,024, issued Aug. 14, 1973. In the cutting mechanism of the '024 patent, a rotary sawing blade and a rotary trimming blade are each arranged in opposed relationship to each other on opposite sides of the roll of material, and are separately driven into the roll so that the trimming blade trims the rough edges formed on the material as the sawing blade cuts a kerf in the roll. It will be appreciated that in accordance with the mechanism of the '024 patent, edges of the cut material cannot fuse to each other after the blades are withdrawn, as a finite width of material is removed from the roll by the sawing blade to separate adjacent edges of the cut material.

While the cutting mechanism of the '024 patent has theoretical advantages over the use of a single sawing or cutting blade to sever a roll of material into separate narrower rolls, it does require a drive system capable of rotating each of the two blades therein at proper respective rates, and to advance them through the material in timed relationship with each other. Accordingly, this mechanism was not found to be as successful as hoped in actually achieving the desired goals. Therefore, use of a mechanism incorporating a single blade which has both knife cutting or trimming and material removal capabilities would be most desirable, especially if improved performance could be achieved.

A single blade having both sawing and knife cutting edges is disclosed in U.S. Pat. No. 2,015,877 of Oct. 1, 1935. The blade of the '877 patent includes a circular saw sandwiched between a pair of circular knife-edged cutting discs which are of slightly greater diameter than the saw. According to the '877 patent, when the composite blade therein is brought against a roll of paper, the cutting discs slice the paper as the saw removes a kerf formed between the discs. However, the patented blade cannot be used for cutting rolls of material such as plastic which would readily clog the cutting teeth of the saw when softened by frictional heat generated from the cutting action of the outer knife-edged discs.

Broadly, it is an object of the present invention to provide an improved cutting mechanism which obviates one or more of the aforesaid difficulties. Specifically, it is within the contemplation of the present invention to provide a cutting mechanism for relatively dense rolls of plastic and like materials in which separate sawing and cutting operations are performed simultaneously by separate blades, respectively, moving at different speeds, such that fusing is prevented by the elimination of excessive heat.

It is a further object of the present invention to establish individual speeds of rotation of sawing and cutting blades relative to the roll of material so as to enable the obtainment of optimum cutting conditions for varying types of materials, roll densities and roll diameters.

It is still a further object of the present invention to provide a saw and cutting blade assembly which can be driven by a conventional single cutting blade drive mechanism.

In accordance with an illustrative embodiment demonstrating objects and features of the present invention, a cutting mechanism for cutting an elongated roll of material into a number of narrower rolls includes a shaft mounted for rotation about an axis substantially parallel to the longitudinal axis of the roll, and means for urging the shaft toward the roll. A pair of spaced-apart cutting blades are mounted on the shaft for free rotational movement about the shaft axis. The cutting blades cooperate to engage and transversely slice the roll across a given width of the material when the shaft is urged toward the roll and the roll is rotated about its longitudinal axis. The cutting blade edges thereby attain substantially the same velocity as the material at their point of contact, so that friction between the cutting blades and the material is significantly reduced. A saw blade is fixedly mounted to the shaft between the cutting blades and in axial alignment therewith. The saw operates to remove or hog material from the roll which is present across the given width, simultaneously with the operation of the cutting blades.

The above brief description, as well as other objects, features and advantages of the present invention will be more fully appreciated by reference to the following detailed description of a presently preferred, but nonetheless illustrative embodiment according to the present invention, when taken in conjunction with the accompanying drawings, wherein.

Figure 2:
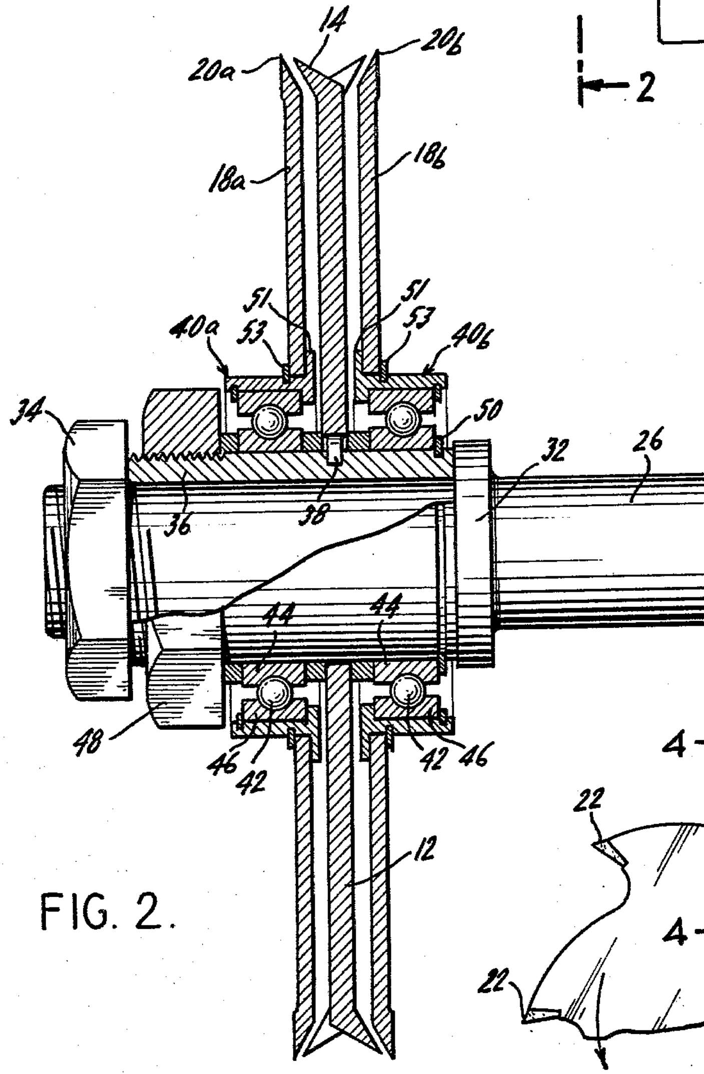
FIG. 2 is a fragmentary sectional view of the cutting and saw blades mounted on a blade shaft, and showing constructional details of the present cutting mechanism as taken substantially along line 2—2 of FIG. 1 and in the direction of the arrows.
Figure 5:
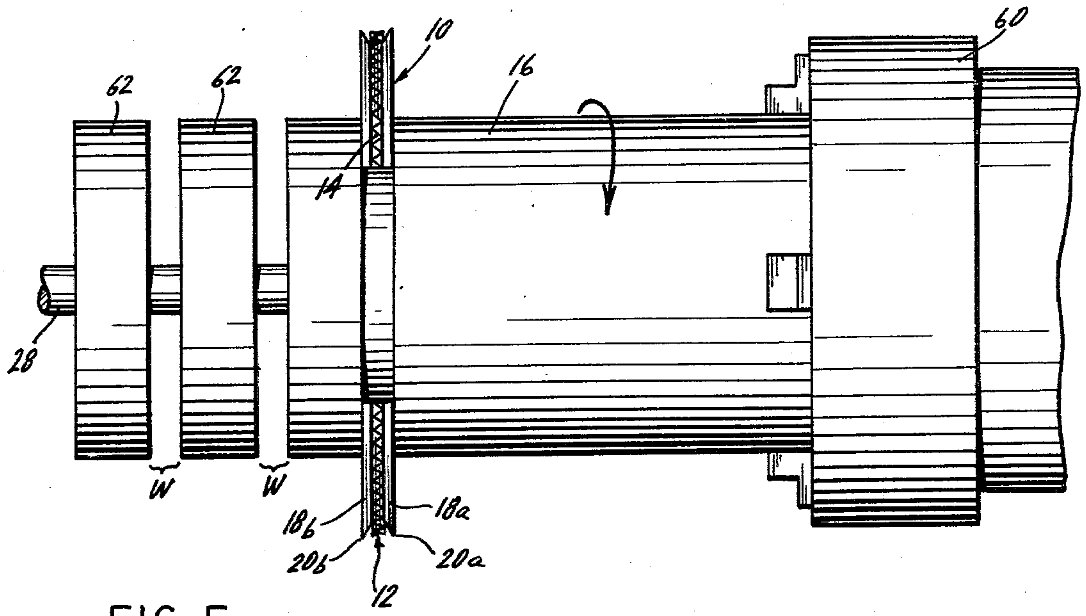
Figure 6:
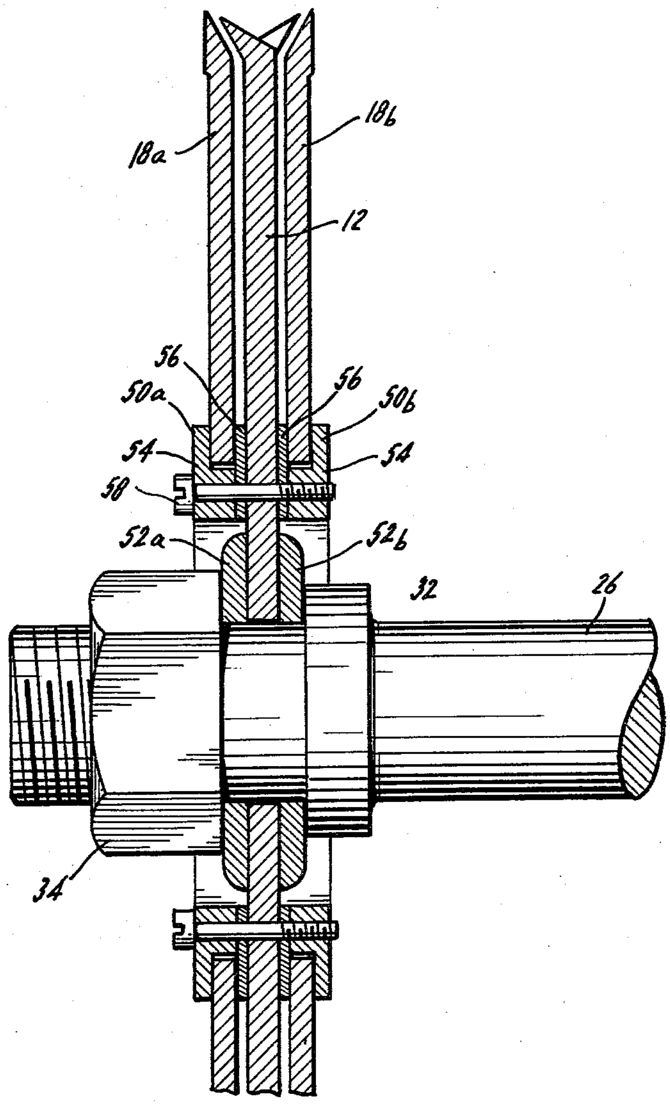

FIG. 5 is a fragmentary elevational rear view of the present cutting mechanism showing the roll of material clamped in a rotating chuck and being sliced into a number of successive narrower rolls in accordance with the present invention; and FIG. 6 is a fragmentary sectional view, similar to FIG. 2, of another pair of cutting blades and a saw blade mounted on the blade shaft in accordance with the present invention.

Figure 1:
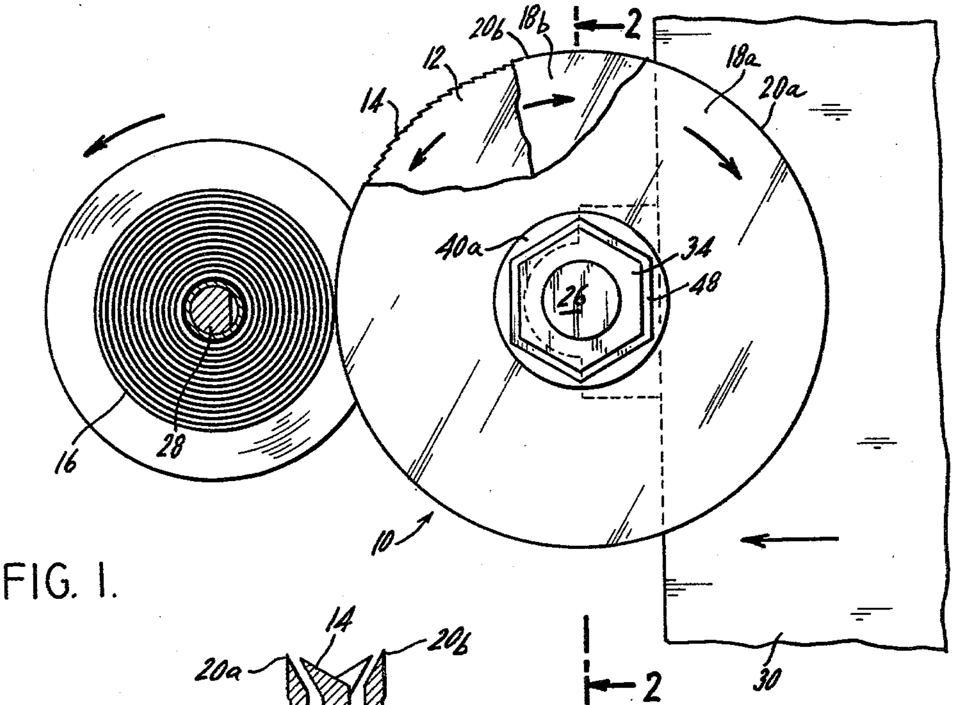
FIG. 1 is a fragmentary elevational end view, partly in section and with parts broken away, showing constructional details of a cutting mechanism in accordance with the present invention, including a pair of cutting blades and a saw blade operatively mounted to cut into a roll of material.
Figure 4:
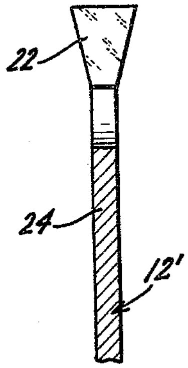
FIG. 4 is a fragmentary sectional view of the saw blade of FIG. 3, as taken substantially along line 4—4 of FIG. 3 and in the direction of the arrows.
Figure 3:
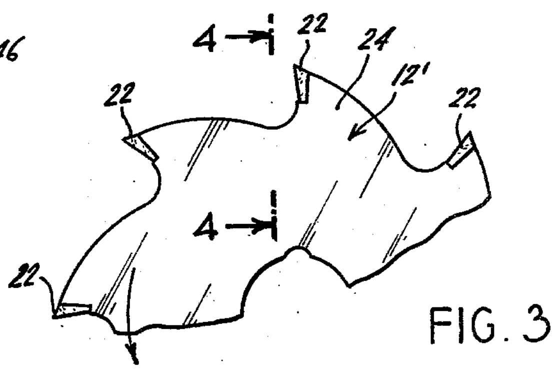
FIG. 3 is a fragmentary elevational side view of another saw blade suitable for use in the cutting mechanism of the present invention.

Referring now in detail to the drawings, and initially to FIGS. 1 and 2 thereof, a rotary cutting mechanism in accordance with the present invention is generally designated by the reference numeral 10. The mechanism 10 includes an inner rotary saw blade 12 having an outer sawing edge 14 and a generally circular central mounting hole. Edge 14 is of sufficient sharpness and configuration to remove or hog material from the roll 16 when it engages the roll during a slicing operation. FIG. 2 illustrates one suitable saw blade configuration having a relatively large number of closely spaced teeth which are slightly tapered outwardly from alternate sides of the blade 12 to remove a finite width of material. Another suitable construction for the saw blade is shown in detail in FIGS. 3 and 4. This saw blade 12′ includes a total of eight teeth 22, four of which are shown in FIG. 3. For blade diameters over about 15 inches (38.1 cm), more teeth should be included. The teeth 22 are of carbide steel and are brazed to a steel body 24 in the orientation shown. Each of the teeth 22 tapers outwardly from both sides of the blade body 24. The particular applications for which each of these blade constructions are best suited will be explained later below. It should be noted, however, that any saw blade having a relatively wide bite for removal of material can be used.

Referring to FIGS. 1 and 2, the cutting mechanism 10 also includes a pair of rotary cutting or trimming blades 18*a* and 18*b*, these blades having outer knife cutting edges 20*a* and 20*b*, and generally circular central mounting holes, respectively. Cutting blades 18*a* and 18*b* are formed of steel and are hollow ground on their outer surfaces to a depth of about 0.010 in. (0.25 mm) as shown in FIG. 2. Their respective edges 20*a* and 20*b* are sufficiently sharp to slice into the roll of material 16 when urged against the roll as it rotates.

Both of the cutting blades 18*a* and 18*b*, and the saw blade 12 (or 12′), are preferably supported on a common driven shaft 26. Shaft 26 is aligned parallel to a stationary shaft 28 which supports the roll of material 16 for rotation about the axis of shaft 28 as the roll 16 is being cut (FIG. 1). The shaft 26 supporting the cutting and saw blades can be urged toward the roll 16 by way of a movable carriage 30 in any conventional manner such as that disclosed in the ’310 patent.

Depending upon the overall diameters selected for the pair of cutting blades and the saw blade, respectively, it will be understood that as they are moved together toward the roll 16 by shaft 26, the blade or blades of larger diameter will engage the material initially. Best results are obtained when the cutting blade edges 20*a*, 20*b* engage the material ahead of the edges on the saw blade. Also, in such an arrangement, it is preferred that the saw blade 12′ of FIGS. 3 and 4 be used. Accordingly, the cutting blade edges 20*a*, 20*b* should extend radially outwardly a particularly leading distance beyond the edges 22 of the saw blade 12′. It has been found that this leading distance should be about 0.050 inches (1.27 mm) for best results, although this distance is not critical. Should the overall diameters chosen for the saw and cutting blades be equal, or the saw blade be larger so as to lead the cutting blades when urged against the roll 16, then the saw blade 12 of FIG. 2 having a relatively large number of teeth (e.g., 120) should be used.

Details regarding the mounting of the saw and cutting blades on the shaft 26 will now be explained with reference to FIG. 2. The shaft 26 includes a raised collar 32 formed circumferentially thereon, the collar 32 being located a predetermined distance from the free end of the shaft which is threaded to engage a correspondingly threaded nut 34, as shown. The collar 32 and nut 34 cooperate to secure the blades in their respective positions as the shaft 26 is rotated by unshown conventional driving means.

The saw blade 12 (or 12′) is joined to a sleeve hub 36 which has a central bore of sufficient diameter to enable a tight sliding fit over the threaded end of the shaft 26, so that one end of the hub 36 abuts the raised collar 32 as shown. The saw blade is locked to the hub 36 by a key 38 which extends upwardly from the hub 36 to engage a corresponding keyway formed in the edge of the mounting hole in the saw blade. It will be understood that when the shaft nut 34 is tightened against the other end of hub 36 to force the hub against the raised shaft collar 32, the hub and the saw blade will rotate together in direct response to rotation of the drive shaft 26.

While the cutting blades 18*a* and 18*b* are also supported on the shaft 26, they are not mounted to rotate together with the shaft, but instead are mounted for free rotational movement about the shaft 26 by way of bearing assemblies 40*a* and 40*b*, respectively. These mounting means may be conventional and include ball bearings 42 which are seated in corresponding inner and outer races 44 and 46, respectively. Although ball bearings are shown, it is to be understood that roller bearings or other types of bearings may be substituted. The bearing assemblies 40*a* and 40*b* are secured on the hub 36 at respective sides of the saw blade so that the cutting blades 18*a* and 18*b* extend from respective flange rings on outer bearing races 46 in parallel, coaxial relationship with the saw blade, these flange rings extending through the respective mounting holes in the cutting blades 18*a* and 18*b* as shown in FIG. 2.

The lower bearing races 44 are maintained at their respective locations by way of a retaining nut 48 which engages corresponding threads at one end of the hub 36 and a locking ring 50 which engages a circumferential groove formed about the other end of the sleeve 36. Each of the cutting blades 18*a* and 18*b* is securely maintained on its respective outer bearing race 46 between a raised lip 51 at one end of each race 46 and a snap ring 53 seated within a groove formed circumferentially in the outer surface of each flange ring on the races 46.

By the above construction, it will be appreciated that the saw blade and the cutting blades can be mounted as an integral unit on the shaft 26, thereby facilitating replacement of conventional single cutting blades with the combined sawing and cutting blades of the present invention.

The particular embodiment of the present invention as described above in connection with FIG. 2 is suitable for applications where it is desired to have the saw blade and the cutting blades of a diameter of up to about 20 inches (50.8 cm). For applications where blades having larger diameters of up to about 36 inches (91.4 cm) are desired, for example, it is preferred that the blades be arranged on the shaft 26 as shown in FIG. 6. This configuration provides greater stability to the cutting blades 18*a*, 18*b* so as to prevent them from wobbling or becoming misaligned when slicing through roll 16 because of their greater overall diameter.

Referring to FIG. 6, the cutting blades 18*a*, 18*b* are supported for free rotation about the axis of the shaft 26 and in parallel, coaxial relationship with the saw blade by way of respective bearing assemblies 50*a* and 50*b*. These mounting means are joined to respective sides of the saw blade, rather than to a hub such as 36 in FIG. 2.

In further detail, the saw blade 12 (or 12') is fixedly secured to the shaft 26 by way of opposed flanges 52*a* and 52*b* which overlie and frictionally engage respective sides of the saw blade when the locking nut 34 is tightened against flange 52*a*, thereby forcing flange 52*b* against the shaft collar 32. It is noted that the central mounting hole through the saw blade need only be dimensioned to enable the blade 12 to slide smoothly over the shaft 26 before the blade is tightened in place.

Each of the bearing assemblies 50*a* and 50*b* includes an outer annular ring 54 having a generally L-shaped cross-section as shown in FIG. 6, and is preferably formed of brass or bronze bearing stock. Each of the assemblies 50*a* and 50*b* also includes a brass or teflon spacer 56 in flat ring form which is seated directly against a respective side of the saw blade. Accordingly, each of the cutting blades 18*a* and 18*b* is seated with the edge of its central mounting hole arranged to slide between a respective bearing 54 and spacer 56, when the bearing assemblies 50*a* and 50*b* are mounted on opposite sides of the saw blade by screws 58, as shown.

As with the arrangement of FIG. 2, the arrangementof FIG. 6 enables replacement of prior single cutter blades on conventional cutting mechanisms with the combined cutting and saw blades of the present invention, which can be mounted together on a single shaft such as 26.

Operation of the cutting mechanism of the present invention will now be explained with reference to FIGS. 1 and 5.

While the roll of material 16 is rotated about the stationary shaft 28 by a rotating chuck 60 clamped to one end of the roll (FIG. 5), shaft 26 is urged toward the roll 16 to thereby move the cutting and saw blades together in a cutting plane substantially perpendicular to the axis of the roll supporting shaft 28. The cutting blade edges 20*a* and 20*b* engage the roll 16 and attain substantially the same velocity as the material at their point of contact, due to the free rotational mounting of the cutting blades. Undesirable heat generated by friction between prior cutting blade edges and rolled material, when moving relative to each other during cutting operations, is thus substantially reduced or eliminated by the cutting mechanism 10. As the cutting blades 18*a*, 18*b* continue to be urged against the roll 16, their respective cutting edges 20*a*, 20*b* transversely slice into the roll 16 across a width of material W corresponding to the distance between them. Friction between the cut material left on the roll and the sides of the cutting blades is also avoided because of the hollow grind on the sides of each of the cutting blades 18*a*, 18*b*.

The saw blade is independently driven by the shaft 26 which is rotated in the same direction as the rotating roll 16 by unshown conventional drive means. The saw speed should be sufficient to enable its edges to remove or hog material present across the width W as the cutting blades 18*a* and 18*b* continue to slice into the roll 16. As shown in FIG. 5, successive, relatively narrow rolls of material 62, each separated by about the width W and having smoothly finished side edges, can be produced by properly indexing the axial movement of the blade shaft 26 and urging it toward the roll 16 at each indexed position. Usually, the width of the finished rolls 62 will be relatively greater than that suggested in FIG. 5. However, if waste is not an important consideration, a number of relatively thin finished rolls may be obtained from the larger unfinished roll 16 as well.

In accordance with the above operation of the present invention, the heat developed by the cutting blades 18*a* and 18*b*, if any, is relatively slight since their respective cutting edges 20*a* and 20*b* are not forcibly rotated by the driven shaft 26 against the movement of the roll 16, but are free to turn with the material on the roll as they slice through it.

As will be readily apparent to those skilled in the art, the present invention may be realized in other specific forms without departing from its spirit or essential characteristics. The present embodiments are, therefore, to be considered as illustrative and not restrictive, the scope of the invention being indicated by the claims rather than by the foregoing description, and all changes which come within the meaning and range of equivalents of the claims are therefore intended to be embraced therein.

I claim:

1. In a cutting mechanism for cutting an elongated roll of material along a plane substantially perpendicular to the longitudinal axis of said roll when said roll is rotated about said longitudinal axis to be cut into plural narrower rolls, said cutting mechanism including a driven cutting wheel shaft mounted for rotation about an axis substantially parallel to said longitudinal axis, means for driving said shaft in rotary motion, and means for urging said shaft toward said roll, the improvement comprising a pair of spaced-apart cutting blades mounted on said shaft for free rotational movement about the axis of said shaft, said cutting blades having respective cutting edges for cooperatively engaging and slicing said roll across a given width of said material when said shaft is urged toward said roll and said roll is rotated, and a saw blade fixedly mounted to said shaft intermediate said cutting blades and in axial alignment therewith for removing material from said roll which is present across said given width in response to said shaft being driven in rotary motion and simultaneously with the operation of said cutting blades.

2. The improved cutting mechanism of claim 1, further including a bearing assembly mounted between said shaft and each of said cutting blades.

3. The improved cutting mechanism of claim 1, further including a bearing assembly mounted between said saw blade and each of said cutting blades.

4. The improved cutting mechanism of claim 1, wherein said cutting edges extend radially outwardly a greater distance than said saw blade.

5. A cutting mechanism for cutting an elongated roll of material along a plane substantially perpendicular to the longitudinal axis of said roll to cut said roll into plural narrower rolls, said mechanism comprising a pair of spaced-apart cutting blades mounted for rotation about an axis substantially parallel to said longitudinal axis and having respective cutting edges for cooperatively slicing said roll across a given width of said material, means for rotating said cutting blades at a given speed and in a given direction with respect to said roll, a rotatable saw blade mounted intermediate said cutting blades and in axial alignment therewith for removing material from said roll which is present across said given width simultaneously with the operation of said cutting blades, means for rotating said saw blade at another given speed and in another given direction with respect to said roll, and means for urging said pair of cutting blades and said saw blade against said roll so that said cutting edges engage and slice said roll as said cutting blades are rotated and said saw blade removes said material present across said given width when said saw blade is rotated.

6. A cutting mechanism according to claim 5, wherein said roll is rotatable about said longitudinal axis and said cutting blade rotating means includes said rotatable roll.

7. A cutting mechanism according to claim 6, wherein said cutting blade rotating means further includes a shaft for supporting said cutting blades forfree rotational movement about the axis of said shaft, said cutting blades freely rotating about said shaft axis when said cutting edges engage said roll.

8. A cutting mechanism for cutting an elongated roll of material along a plane substantially perpendicular to the longitudinal axis of said roll when said roll is rotated about said longitudinal axis to be cut into plural narrower rolls, said mechanism comprising a driven shaft mounted for rotation about an axis substantially parallel to said longitudinal axis, means for driving said shaft in rotary motion, a pair of spaced-apart rotary cutting blades mounted for free rotation about the axis of said shaft and having respective cutting edges for cooperatively slicing said roll across a given width of said material, a rotary saw blade fixedly mounted to said shaft intermediate said cutting blades and in axial alignment therewith for removing material from said roll which is present across said given width simultaneously with the operation of said cutting blades, bearing means coupled between said shaft and each of said cutting blades, and means for urging said pair of cutting blades and said saw blade against said roll so that said cutting blades are rotated and said saw blade removes said material present across said given width when said shaft and saw blade are rotated.

9. A cutting mechanism according to claim 8, wherein said bearing means is mounted between said shaft and each of said cutting blades.

10. A mechanism according to claim 8, wherein said bearing means is mounted between said saw blade and each of said cutting blades.

11. A combined cutting and sawing blade assembly comprising a hub adapted to be secured to a rotatable shaft, a saw blade fixedly mounted to said hub in axial alignment therewith, a pair of spaced-apart cutting blades mounted for free rotational movement about the axis of said hub, said saw blade being located intermediate said cutting blades, and a pair of bearing assemblies mounted between said hub and each of said cutting blades, respectively, for enabling said free rotational movement.

12. A combined cutting and sawing blade assembly comprising a saw blade having a central opening therein to enable said saw blade to be fixedly mounted on a rotatable shaft, a pair of spaced-apart cutting blades mounted for free rotational movement about the axis of said saw blade, and a pair of bearing assemblies each mounted between respective sides of said saw blade and a respective one of said cutting blades for enabling said free rotational movement.

* * * * *